United States Patent
Duchemin et al.

(10) Patent No.: US 10,442,558 B2
(45) Date of Patent: Oct. 15, 2019

(54) SPACE VEHICLE WITH ELECTRIC PROPULSION AND SOLID PROPELLANT CHEMICAL PROPULSION

(71) Applicant: HERAKLES, Le Haillan (FR)

(72) Inventors: Olivier Duchemin, Magny-les-Hameaux (FR); Pierre Marcel Yvart, Ballancourt sur Essonne (FR)

(73) Assignee: HERAKLES, Le Haillan (FR)

( * ) Notice: Subject to any disclaimer, the term of this patent is extended or adjusted under 35 U.S.C. 154(b) by 298 days.

(21) Appl. No.: 14/375,615

(22) PCT Filed: Jan. 31, 2013

(86) PCT No.: PCT/FR2013/050208
§ 371 (c)(1),
(2) Date: Jul. 30, 2014

(87) PCT Pub. No.: WO2013/114049
PCT Pub. Date: Aug. 8, 2013

(65) Prior Publication Data
US 2015/0021439 A1    Jan. 22, 2015

(30) Foreign Application Priority Data

Feb. 1, 2012 (FR) .................................. 12 50945

(51) Int. Cl.
*B64G 1/40* (2006.01)
*B64G 1/42* (2006.01)
(Continued)

(52) U.S. Cl.
CPC ............... *B64G 1/403* (2013.01); *B64G 1/10* (2013.01); *B64G 1/24* (2013.01); *B64G 1/405* (2013.01);
(Continued)

(58) Field of Classification Search
CPC .... B64G 2001/245; B64G 1/24; B64G 1/405; B64G 1/401; B64G 1/443; B64G 1/428;
(Continued)

(56) References Cited

U.S. PATENT DOCUMENTS 4,069,664 A * 1/1978 Ellion ...................... F02K 9/68
422/607
5,170,623 A * 12/1992 Dailey ..................... F02K 9/74
60/202

(Continued)

FOREIGN PATENT DOCUMENTS

EP             1227038         7/2002
WO     WO 2009/140635        11/2009

OTHER PUBLICATIONS

Krauthamer et al.: "Power Processing Units for High Powered Solar Electric Propulsion Using MPD Thrusters"; Aerospace Power, Conversion Technology, Electrochemical Conversion. Atlanta, Aug. 8-13, 1993; vol. 1, Aug. 8, 1993, pp. 1.285-1.290, XP000428314.

*Primary Examiner* — Medhat Badawi
(74) *Attorney, Agent, or Firm* — Hamre, Schumann, Mueller & Larson, P.C.

(57) ABSTRACT

A space vehicle (1), in particular a satellite or a probe, capable of executing high-thrust maneuvers or high specific impulse maneuvers. According to the invention, the space vehicle (1) includes at least one solid-propellant chemical thruster (10-14) and at least one electric thruster (20-24).

10 Claims, 2 Drawing Sheets

(51) Int. Cl.
*F02K 9/22* (2006.01)
*B64G 1/10* (2006.01)
*B64G 1/24* (2006.01)
*F03H 1/00* (2006.01)

(52) U.S. Cl.
CPC ............. *B64G 1/406* (2013.01); *B64G 1/42* (2013.01); *B64G 1/428* (2013.01); *F02K 9/22* (2013.01); *F03H 1/0018* (2013.01)

(58) Field of Classification Search
CPC ......... B64G 1/403; B64G 1/425; B64G 1/10; B64G 1/26; B64G 1/406; B64G 1/42; G05D 1/063; F02K 9/22; F03H 1/0018; F03H 1/0012; F03H 1/005
USPC ........................................................ 244/171
See application file for complete search history.

(56) References Cited

U.S. PATENT DOCUMENTS

| | | | | |
|---|---|---|---|---|
| 5,312,073 A * | 5/1994 | Flament | ............... | B64G 1/24 136/292 |
| 5,651,515 A * | 7/1997 | Saccoccia | ............... | B64G 1/007 244/158.5 |
| 5,711,348 A * | 1/1998 | Morash | ............... | B64G 1/26 137/625.45 |
| 6,032,904 A * | 3/2000 | Hosick | ............... | B64G 1/26 244/169 |
| 6,216,445 B1 * | 4/2001 | Byers | ............... | F03H 1/0012 60/202 |
| 6,269,629 B1 * | 8/2001 | Spanjers | ............... | B64G 1/405 60/203.1 |
| 6,439,507 B1 * | 8/2002 | Reckdahl | ............... | B64G 1/242 244/158.8 |
| 6,445,981 B1 * | 9/2002 | Higham | ............... | B64G 1/26 701/13 |
| 6,464,174 B1 * | 10/2002 | Turner | ............... | B64G 1/007 244/158.6 |
| 6,481,672 B1 * | 11/2002 | Goodzeit | ............... | B64G 1/26 244/169 |
| 6,543,723 B1 * | 4/2003 | Oh | ............... | B64G 1/007 244/158.5 |
| 6,565,043 B1 * | 5/2003 | Wittmann | ............... | B64G 1/242 244/169 |
| 6,581,880 B2 * | 6/2003 | Randolph | ............... | B64G 1/242 244/169 |
| 6,637,701 B1 * | 10/2003 | Glogowski | ............... | B64G 1/242 244/169 |
| 6,695,263 B1 * | 2/2004 | Goodzeit | ............... | B64G 1/361 244/164 |
| 6,702,234 B1 * | 3/2004 | Goodzeit | ............... | B64G 1/283 244/164 |
| 6,732,977 B1 * | 5/2004 | Goodzeit | ............... | B64G 1/28 244/164 |
| 6,945,500 B2 * | 9/2005 | Wingo | ............... | B64G 1/1078 244/159.4 |
| 7,051,980 B2 * | 5/2006 | Goodzeit | ............... | B64G 1/1085 244/158.4 |
| 7,059,571 B2 * | 6/2006 | Kellberg | ............... | B64G 1/405 244/169 |
| 7,113,851 B1 * | 9/2006 | Gelon | ............... | B64G 1/007 701/13 |
| 7,118,075 B2 * | 10/2006 | Schubert | ............... | B64G 1/242 244/169 |
| 7,149,611 B2 * | 12/2006 | Beck | ............... | B60K 17/046 701/2 |
| 7,530,218 B2 * | 5/2009 | Simon | ............... | F03H 1/00 60/203.1 |
| 7,654,490 B2 * | 2/2010 | Patel | ............... | B64G 1/26 244/165 |
| 7,926,258 B1 * | 4/2011 | Burton | ............... | F03H 1/0087 315/111.21 |
| 8,016,240 B2 * | 9/2011 | Caplin | ............... | B64G 1/1085 244/158.5 |
| 8,056,863 B2 * | 11/2011 | Wang | ............... | B64G 1/244 244/164 |
| 8,464,640 B2 * | 6/2013 | Sawka | ............... | C06B 45/00 102/202 |
| 8,550,405 B2 * | 10/2013 | Hruby | ............... | B64G 1/405 244/171 |
| 8,613,188 B2 * | 12/2013 | Stein | ............... | F03H 1/0093 60/203.1 |
| 8,763,957 B1 * | 7/2014 | Higham | ............... | B64G 1/007 244/158.6 |
| 8,998,146 B2 * | 4/2015 | Woo | ............... | B64G 1/26 244/165 |
| 10,183,765 B2 * | 1/2019 | Bibighaus | ............... | B64G 1/26 |
| 10,232,959 B2 * | 3/2019 | Moro | ............... | B64G 1/242 |
| 10,336,475 B1 * | 7/2019 | Delgado | ............... | B64G 1/405 |
| 2005/0005593 A1 * | 1/2005 | Beattie | ............... | F03H 1/0025 60/202 |
| 2005/0257515 A1 * | 11/2005 | Song | ............... | B05B 5/008 60/202 |
| 2007/0033920 A1 * | 2/2007 | Song | ............... | B05B 5/025 60/202 |
| 2007/0056262 A1 * | 3/2007 | Leach | ............... | B64G 1/405 60/204 |
| 2008/0072565 A1 * | 3/2008 | Bekey | ............... | F03H 1/005 60/203.1 |
| 2008/0121548 A1 * | 5/2008 | Yousefiani | ............... | F02K 9/34 206/524.3 |
| 2009/0029240 A1 * | 1/2009 | Gardner | ............... | H01M 2/08 429/94 |
| 2009/0120056 A1 * | 5/2009 | Friedberger | ............... | F02K 9/62 60/203.1 |
| 2009/0139206 A1 * | 6/2009 | Spanjers | ............... | F02K 9/08 60/256 |
| 2009/0148352 A1 * | 6/2009 | Zubrin | ............... | C01B 13/0203 422/126 |
| 2013/0047578 A1 * | 2/2013 | Gascon | ............... | F02K 9/72 60/202 |
| 2015/0021439 A1 * | 1/2015 | Duchemin | ............... | F02K 9/22 244/171.1 |

* cited by examiner

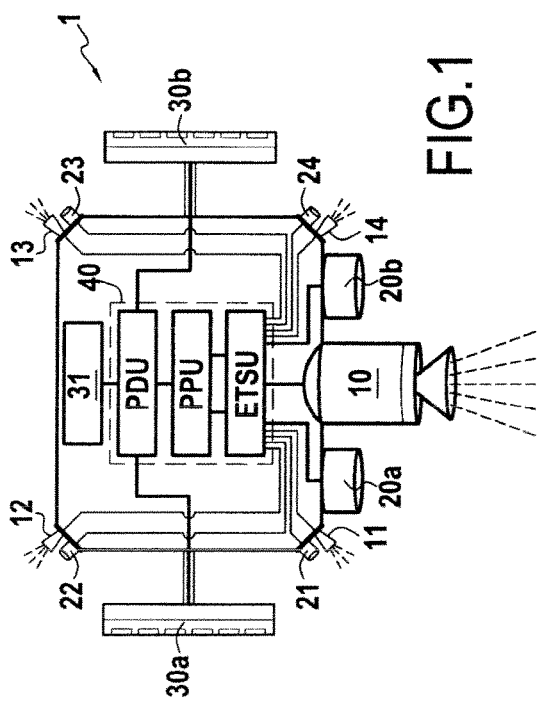
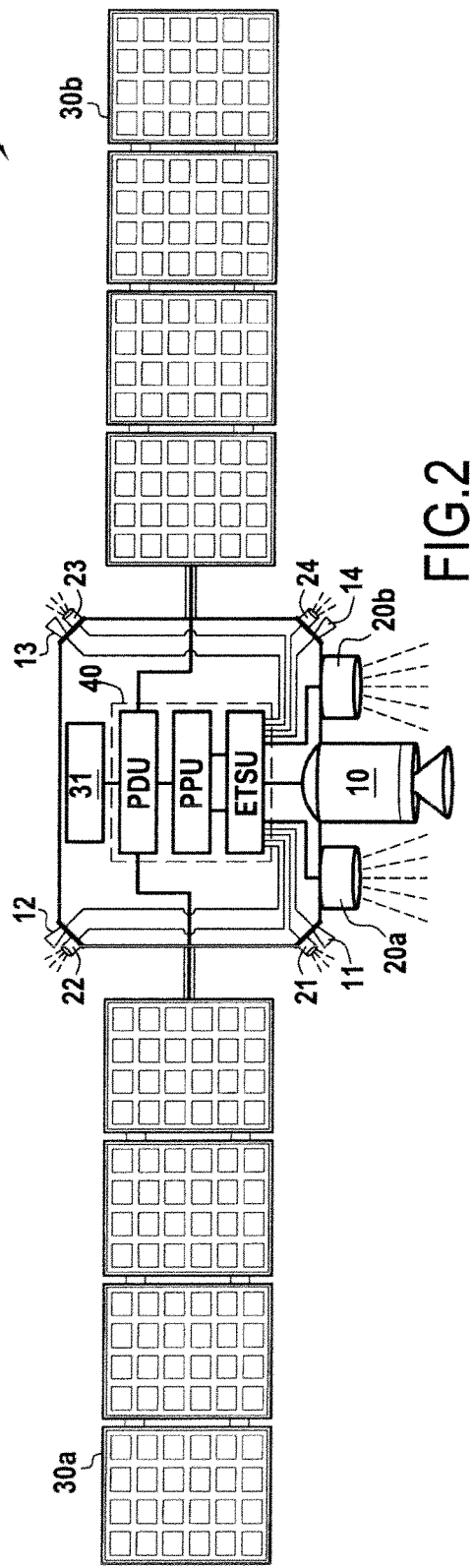

SPACE VEHICLE WITH ELECTRIC PROPULSION AND SOLID PROPELLANT CHEMICAL PROPULSION

FIELD OF THE INVENTION

The present description relates to a space vehicle.

Such a space vehicle may be a satellite, a probe, or indeed the top stage of a rocket, to mention only these examples.

STATE OF THE PRIOR ART

Satellites and other space vehicles are commonly fitted with thrusters enabling them to maneuver in space. Such thrusters are frequently liquid-propellant chemical thrusters: such chemical thrusters are capable of providing high levels of acceleration, of the order of several g or of tens of g, however they suffer from specific impulse that is rather low. Specific impulse (Isp) is proportional to the ratio between the thrust of the thruster and the mass flow rate of ejected particles: it thus represents a certain measure of the effectiveness of the thruster.

Electric thrusters have been in development over several years: these thrusters produce thrust by accelerating and injecting charged particles, in particular ions. Such electric thrusters present much better specific impulse, about 5 to 10 times greater than that of chemical thrusters. In contrast, they deliver very low levels of acceleration, of the order of $10^{-5}$ g, which nevertheless give rise to significant speeds when they are maintained over a long duration.

Taking advantage of these contrasting specific features, known space vehicles are provided both with liquid-propellant chemical thrusters adapted to fast maneuvers that require high levels of acceleration, and also with electric thrusters that are adapted to maneuvers that are not constraining in terms of duration.

Nevertheless, liquid propulsion is expensive, complex, and not very robust. Also, new environmental standards may soon restrict the use of certain liquid propellants that are frequently used at present, in particular hydrazine.

There therefore exists a real need for a space vehicle having propulsion that avoids, at least in part, the drawbacks inherent to the above-mentioned known propulsion systems.

SUMMARY OF THE INVENTION

The present description relates to a space vehicle having at least one solid-propellant chemical thruster, and at least one electric thruster.

Solid-propellant chemical thrusters, also referred to below as solid thrusters, provide a range of thrust comparable to that of liquid-propellant chemical thrusters: they can therefore easily take the place of liquid thrusters for use of the high-thrust type, in particular as the main thruster of a space vehicle. They are thus advantageously used when maneuvers need to be performed quickly: for example, such a maneuver may be a planetary capture maneuver, a maneuver of exiting an environment that is harmful for the vehicle, such as the Van Allen radiation belts, for example, or an emergency maneuver.

Furthermore, solid thrusters are less complex and thus less expensive than corresponding liquid thrusters. In particular a solid propellant is simpler to store: specifically, it does not need pressurized tanks, delivery pipes, or preheating. Nor does it require separate storage of two propellants, nor does it require a device enabling propellants to be mixed prior to combustion. In addition to increased simplicity, solid thrusters reduce the weight of on-board equipment, thereby correspondingly increasing the available payload of the vehicle, thus constituting another significant economic advantage. Also, the toxicity of solid propellants is generally less than that of liquid propellants, and they are therefore less subjected to environmental restrictions.

Electric thrusters provide thrust that is much smaller, but they offer much greater Isp: they can therefore advantageously take the place of chemical thrusters for maneuvers that are little constrained by duration, i.e. maneuvers in which the vehicle will experience a significant change to its speed vector only after a longer duration. By way of example, such a maneuver might be an orbit transfer, a cargo mission, or putting a satellite on station.

The space vehicle thus combines the advantages of solid thrusters and the advantages of electric thrusters while reducing the impact of their respective drawbacks by taking advantage of the specific features of the different kinds of maneuver that need to be executed.

In certain embodiments, the solid-propellant chemical thruster is of the electrically controllable type to enable the thruster to be switched on and off and to enable its thrust to be modulated. This enables the solid thruster to be highly modular, since it can be switched on, and off, and then on again several times in a single mission; its thrust can also be modulated over a certain range, thereby making a great variety of different trajectories available. A solid thruster is switched on and its power is controlled by the characteristics of an electrical control signal applied to the thruster: such a signal may be constituted by a voltage, by a current, and/or by a polarity. An example of a solid-propellant chemical thruster with electrical control is described in international patent application WO 2009/140635.

In certain embodiments, the electric thruster is of the steady state plasma type, i.e. of the Hall effect type. It may also be a gridded ion thruster of the Kaufmann type, a staged plasma thruster of coaxial type, or any other thruster in which charged particles are accelerated and then ejected.

In certain embodiments, the vehicle further comprises a shared power supply and control system configured to provide electrical power and control both to the solid-propellant chemical thruster and to the electric thruster. This sharing enables the power supply and control systems of the overall thrust system to be simplified. In particular, it is possible to adapt an existing power supply and control system so that it can also be used to power and to control a solid thruster: this facilitates the transition from liquid technology to solid technology.

In certain embodiments, the shared power supply and control system comprises a power distribution device configured to deliver a regulated electrical power supply from at least one electrical energy source, a power supply and control device configured to deliver a plurality of electrical power supplies of different types from the regulated electrical power supply, and a switch device configured to connect certain of said electrical power supplies selectively to certain thrusters. The solid thruster can then be integrated in an already-known architecture, thereby limiting the adaptations necessary for using a solid thruster and facilitating the transition to this technology.

In certain embodiments, the electrical energy source comprises solar panels and/or batteries. It may also comprise a nuclear energy source associated with a thermoelectric converter system or any other device capable of delivering electricity.

In certain embodiments, the telemetry, the remote control, and the control logic for the solid-propellant chemical thruster and for the electric thruster are shared in the power supply and control device. This provides complete sharing of the equipment needed for operating both types of thruster, and therefore further facilitates integrating solid technology in the architecture of the space vehicle. This sharing and this integration make the solid thrust system simple and highly modular: in this way, it may constitute an optional module on a standard platform.

In certain embodiments, the power supply and control device delivers at least one main power supply adapted to the operation of the electric thruster and at least one auxiliary power supply adapted to the operation of the solid-propellant chemical thruster. The main power supply is advantageously of high power, since nearly all of the energy used by the electric thruster for delivering thrust is of electrical origin. Conversely, the auxiliary power supply may be of lower power since it is used only for maintaining and modulating combustion of the solid propellant: nearly all of the energy used by the solid thruster for delivering thrust is of chemical origin.

In certain embodiments, the main power supply delivers a direct current (DC) voltage lying in the range about 200 volts (V) to about 1500 V with power lying in the range about 1 kilowatt (kW) to about 10 kW, and the auxiliary power supply delivers a DC voltage lying in the range about 20 V to about 350 V with power lying in the range about 50 watts (W) to about 200 W. The auxiliary power supply may be the power supply of the starter electrode of the electric thruster, for example.

In certain embodiments using solar panels, the panels are folded at least in part while the solid thruster is in operation. This serves to avoid applying excessive stresses to the solar panels during maneuvers that require a high level of acceleration.

In certain embodiments, the power supply and control device is configured to enable a solid-propellant chemical thruster and an electric thruster to operate simultaneously.

In certain embodiments, the space vehicle includes at least one main solid-propellant chemical thruster and a plurality of small solid-propellant chemical thrusters of lower power. The power of these small solid thrusters may be of the order of 2% of the power of the main solid thruster. They may be arranged at various points on the space vehicle in order to provide the space vehicle with three-axis attitude control.

In certain embodiments, the space vehicle includes at least one main electric thruster and a plurality of small electric thrusters of lower power. The power of these small electric thrusters may be of the order of 2% of the power of the main electric thruster. They may be arranged at various points on the space vehicle in order to provide the space vehicle with three-axis attitude control.

In certain embodiments, the space vehicle includes a main solid-propellant chemical thruster arranged substantially on and pointing along an inertia axis of the vehicle, a plurality of main electric thrusters arranged around the main solid-propellant chemical thruster, and at least three small solid-propellant chemical thrusters or at least three small electric thrusters pointing along directions that are not coplanar.

In certain embodiments, the space vehicle has a plurality of main electric thrusters arranged on either side of the main solid thruster. Preferably, these main electric thrusters are two in number.

In certain embodiments, the space vehicle is substantially polyhedral in shape and the small solid thrusters and/or the small electric thrusters are arranged at some or all of the corners of the space vehicle. In particular, a small solid thruster may be associated with each small electric thruster.

In certain embodiments, the propulsion of the space vehicle is provided exclusively by solid propellant chemical thrusters and by electric thrusters. In particular, in certain embodiments, the space vehicle does not have any liquid-propellant chemical thrusters.

In certain embodiments, the space vehicle also has at least one thrust steering device for controlling the orientation of the thrust vector of a solid thruster. Preferably, the steering device comprises electric actuators.

In such embodiments, the thrust steering device is controlled and powered by the shared electrical power supply and control system. More particularly, the power supply and control device delivers at least one power supply adapted to the operation of the thrust steering device.

The above-described characteristics and advantages, and others, appear on reading the following detailed description of embodiments of the proposed space vehicle. The detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are given the same reference signs.

FIG. 1 is a diagrammatic plan view of an embodiment of the space vehicle in a high-thrust mode.

FIG. 2 is a diagrammatic plan view of the FIG. 1 space vehicle in a high-Isp mode.

DETAILED DESCRIPTION OF EMBODIMENT(S)

Figure 3:
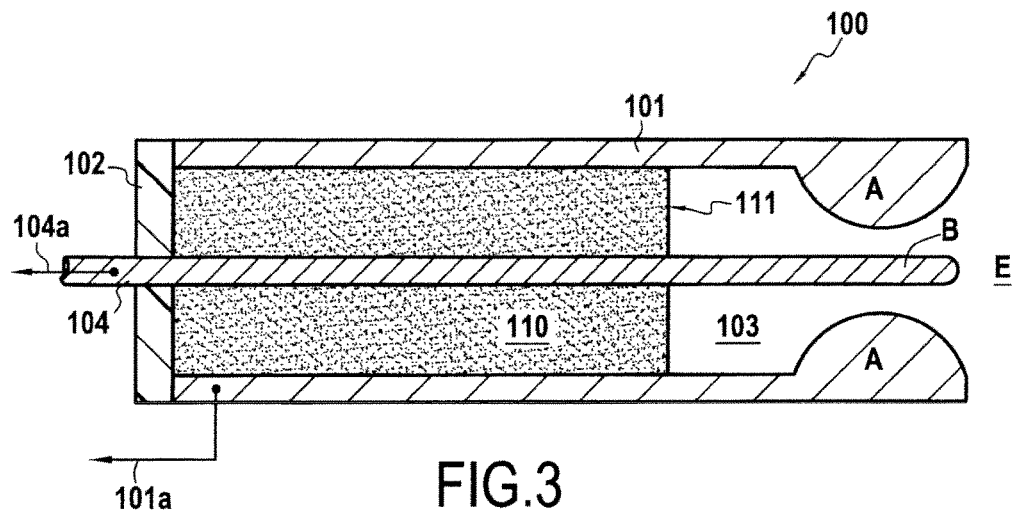
FIG. 3 is a section view of an embodiment of a solid-propellant chemical thruster.

In order to make the invention more concrete, an embodiment of a space vehicle is described in detail below with reference to the accompanying drawings. It should be recalled that the invention is not limited to this embodiment.

FIG. 1 shows an embodiment of the space vehicle 1 seen from above. In this example, the space vehicle 1 is a satellite substantially in the form of a rectangular parallelepiped. It includes a main solid thruster 10 and two main electric thrusters 20*a* and 20*b*. At each of its corners (four corners being shown in the drawing) it also includes a respective small solid thruster 11, 12, 13, or 14, and a respective small electric thruster 21, 22, 23, or 24. The electrical power supply of the vehicle is provided firstly by solar panels 30*a* and 30*b* (shown folded in FIG. 1) and secondly by batteries 31. The space vehicle 1 also possesses a shared power supply and control system 40.

In another embodiment, the small thrusters 11-14 and 21-24 may all be of the same kind, e.g. solid thrusters.

The main solid thruster 10 is arranged at the center of the rear face of the space vehicle 1 and points along the front-to-rear inertia axis of the vehicle 1. The two main electric thrusters 20*a* and 20*b* are arranged in symmetrical manner on either side of the main solid thruster 10. The two small solid thrusters 11-14, of which there are four in this example, point in directions that are not all included in a single plane in order to enable the attitude of the vehicle 1 to be controlled about its center of gravity in all three spatial directions. The same applies to the small electric thrusters 21-24.

FIG. 1 shows the space vehicle 1 executing a high-thrust type maneuver. The main solid thruster 10 is on (ignited) and delivers the major portion of the thrust of the vehicle 1. Some of the small solid thrusters 11-14 may be on (ignited) singly or in combination in order to control the attitude of the vehicle 1. The electric thrusters 20-24 are preferably off. During such a high-thrust type maneuver, it is preferable for the solar panels 30a and 30b to be folded. The shared power supply and control system 40, and thus the control of the solid thrusters 10-14, is then powered by means of the batteries 31.

FIG. 2 shows the space vehicle 1 executing a high-Isp type maneuver. The main electric thrusters 20a, 20b are on and they deliver the major portion of the thrust of the vehicle 1. Some of the small electric thrusters 21-24 may be on singly or in combination in order to control the attitude of the vehicle 1. The solid thrusters 10-14 are preferably off, however the small solid thrusters 11-14 may optionally be used as backup or in an emergency to correct a dangerous trajectory, or to correct an abnormal attitude in the event of the vehicle and its solar panels, for example, being disoriented. During such a high-Isp type maneuver, it is preferable for the solar panels 30a and 30b to be deployed and in operation since the electric thrusters consume a large quantity of electricity.

FIG. 3 shows an example of a solid thruster 100. By way of example, it may be one of the small solid thrusters 11-14. The solid thruster 100 possesses a cylindrical body 101 and a base 102 that closes a first end of the cylindrical body 101, thereby forming a cavity 103 inside the cylindrical body 101. A rod 104 passes through the base 102, penetrates into the cavity 103, and extends substantially as far as the second end of the cylindrical body 101. The cavity 103 is filled with a solid propellant 110.

The cylindrical body 101 and the rod 104 are both made of electrically conductive material, not necessarily the same material, while the base 102 is insulating. The cylindrical body 101 and the rod 104 thus constitute respective first and second electrodes A and B that are connected to two respective terminals 101a and 104a.

The solid propellant 110 is a solid propellant in which combustion is activated by an electric current or by the presence of an electric field. It may be a monopropellant or a mixture of two or more chemical species. When a voltage is applied between the electrodes A and B, combustion of the solid propellant 110 is activated at its end surface 111 that is open to the outside, and thus to space E. The gas released during this combustion and injected into space E produces the thrust of the thruster 100. Adjusting the voltage, the current, and/or the polarity at the terminals of the electrodes A and B has an influence on combustion and thus makes it possible to modulate the thrust of the thruster 100. Combustion stops and the thruster 100 thus turns off when the voltage is removed from the terminals of the electrodes A and B.

Returning to FIG. 1, the solid thrusters 10-14 and the electric thrusters 20-24 are powered and controlled by the shared power supply and control system 40. This system comprises a power distribution unit PDU, a power supply and control unit PPU, and a switch device ETSU. It also includes an on-board computer SMU. Its operation can be understood better in the light of FIG. 4.

The power distribution device PDU receives electrical power coming from the solar panels 30a, 30b and from the batteries 31, it regulates it, and it delivers a regulated electrical power supply in the form of a power bus 32 for use by the other modules of the system 40. This power bus 32 is regulated at 50 V or at 100 V, for example.

Nevertheless, in other embodiments, the PPU and the ETSU may be capable of accepting a non-regulated voltage delivered directly by the solar panels or by the batteries, and the device PDU may be omitted.

The power supply and control device PPU receives the electrical power from the power bus 32: it uses its power that it reorganizes in various ways in order to deliver a plurality of electrical power supplies of different types united in a plurality of power supply interfaces 33, 34. In particular, for each interface 33, 34, it delivers both a high-power main power supply 33a, 34a and also one or more auxiliary power supplies (33b, 33c, 34b, 34c) of lower power. In another embodiment, the main power supply 33a, 34a delivers a DC voltage that can be modulated, possibly up to 1000 V at a power of several kilowatts. In this example, the auxiliary power supplies 33b, 33c, 34b, 34c deliver voltages of the order of 20 V to 350 V at powers lying in the range a few tens of watts to about one hundred watts.

Each interface 33, 34 thus has a plurality of power supply channels 33a, 33b, 33c or 34a, 34b, 34c (three being shown in this example for each thruster, however there could be more) in order to power a thruster 10-14 or 20-24 and control each of its functions. Each power supply 33a, 33b, 33c (or 34a, 34b, 34c) may be provided several times over at the outlet from the power supply and control device PPU, which device is capable of controlling and modulating them individually. It is naturally also possible to envisage additional power supplies of different types. The unit PPU typically incorporates the ability to switch between two electric thrusters (outlet interfaces 33 and 34).

Figure 4:
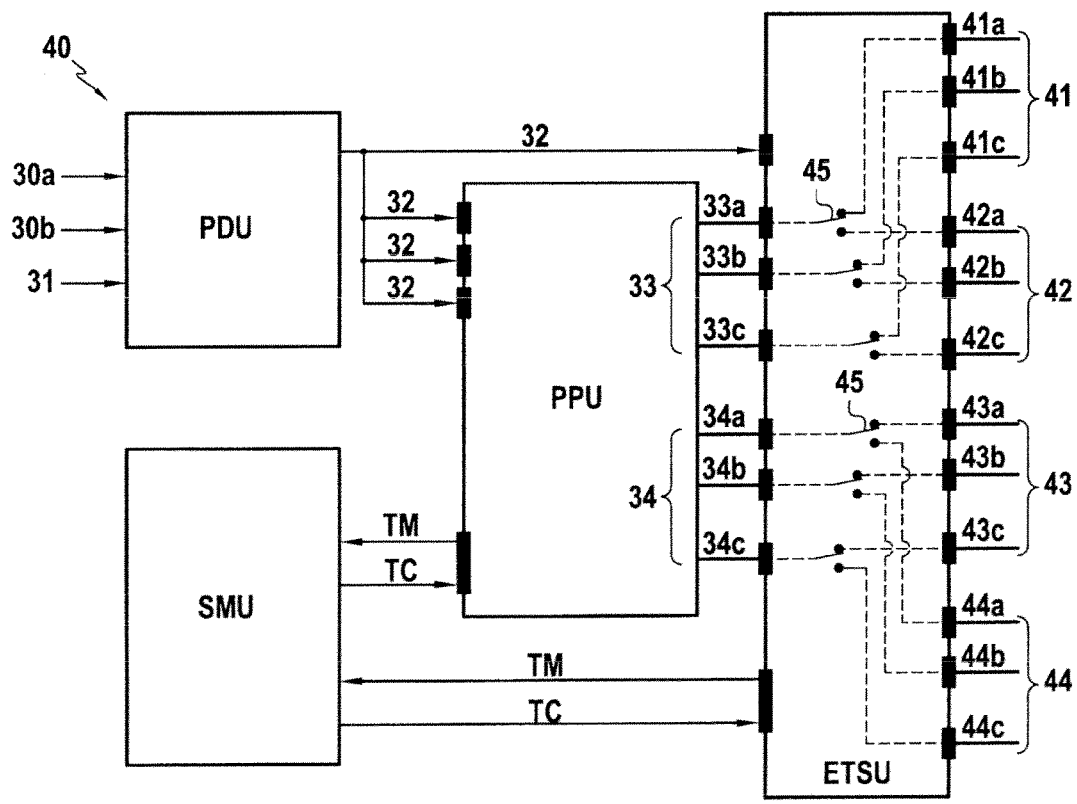
FIG. 4 is a highly simplified diagram showing an embodiment of the shared power supply and control system of the space vehicle.

The switch device ETSU enables a larger number of thrusters (four in this example) to be controlled from a single PPU by once more splitting the two electrical power supply interfaces 33, 34 to the various thrusters 10-14 and 20-24. At its inlet it receives the power supplies 33a-33c and 34a-34c of each of the interfaces 33, 34, and at its outlet it presents electrical connection harnesses 41-44 for the thrusters 10-14, 20-24. Each harness 41-44 has a plurality of channels 41a-44c corresponding to the plurality of channels 33a-33c and 34a-34c of the power supply interfaces 33, 34. Naturally, since FIG. 4 is above all diagrammatic, the way in which the switching device ETSU is shown is greatly simplified for explanatory purposes, showing at its inlet only three power supplies for each thruster electrical interface 33, 34, and showing at its outlet only four electrical connection harnesses 41-44, in spite of there being a greater number of thrusters, as described above.

The switch device ETSU is powered by the power supply bus 32 and possesses an array of relays 45 for implementing the desired switching to direct power and control from a given power supply interface 33, 34 to a thruster 10-14, 20-24 that is to be activated. When switching is performed, all of the channels 33a-33c of a given power supply interface 33 are switched to the channels 41a-41c of a given electrical connection harness 41, while ensuring that connections match.

In this embodiment, the electrical connection harnesses 41 and 42 can power two electric thrusters 20-24, while the connection harnesses 43 and 44 can power two solid thrusters. The control devices is then capable of connecting each set of power supplies to the electric thrusters 20-24 via the connection interface 33 and the electrical connection harnesses 41 and 42 adapted to these thrusters, and it is capable of connecting the same set of power supplies to the solid thrusters 10-14 via the connection interface 34 and the connection harnesses 43 and 44 appropriate for these other thrusters.

In another embodiment, the assembly comprising the units PPU-ETSU can present an outlet suitable for a main electric thruster 20a or 20b, and four outlets suitable for the auxiliary thrusters 10-14 or 20-24. The second main electric thruster and the other four auxiliary thrusters are then powered by a second PPU-ETSU assembly in order to present better robustness in the face of failure.

The on-board computer SMU exchanges data by telemetry TM and/or remote control TC both with the power supply and control device PPU and also with the switch device ETSU. It sends them thrust setpoints for given thrusters 10-14, 20-24. On the basis of the setpoints, the power supply and control device PPU, which incorporates the control logic for the thrusters, together with their telemetry and their remote control, modulates the power delivered by the power supplies in question and transmits certain orders or adjustments to the thrusters in question 10-14, 20-24 via certain channels 33a-34c of the power supply interfaces 33 or 34. The switch device ETSU then performs the necessary switching to connect the power supplies in question to the thrusters 10-14, 20-24 in question. In this embodiment, the power supply and control device PPU also has an internal switch device additional to the external switch device ETSU and it contributes to the overall switching scheme.

In another embodiment, the device PPU may be simplified so as to have only one common thruster power supply interface 33, with the external switch device ETSU providing all of the switching functions between the various thrusters and the matching interfaces.

The embodiments described in the present description are given by way of nonlimiting illustration, and in the light of this description, the person skilled in the art can easily modify these embodiments or can envisage others, while remaining within the scope of the invention.

Furthermore, the various characteristics of these embodiments may be used singly or in combination with one another. When they are combined, these characteristics may be combined as described above or in other ways, the invention not being limited to the specific combinations described in the present description. In particular, unless specified to the contrary, a characteristic described with reference to one particular embodiment may be applied in analogous manner to another embodiment.

The invention claimed is:

1. A space vehicle, comprising:
   at least one solid-propellant chemical thruster;
   at least one electric thruster; and
   a shared power supply and control system configured to provide electrical power and control both to the at least one solid-propellant chemical thruster and to the at least one electric thruster,
   the shared power supply and control system provides main power supply for operating the at least one electric thruster, the main power supply supplying a DC voltage in a range of about 200 V to about 1500 V, and delivering an electrical power (Watt) in a range of about 1 kW to about 10 kW to the at least one electric thruster, and
   the shared power supply and control system provides an auxiliary power supply for operating the at least one solid-propellant chemical thruster, the auxiliary power supply supplying a DC voltage in a range of about 20 V to about 350 V, and delivering an electrical power (Watt) in a range of about 50 W to about 200 W to the at least one solid-propellant chemical thruster,
   wherein the shared power supply and control system comprises:
      a power distribution device configured to deliver a regulated electrical power supply from at least two electrical energy sources;
      a power supply and control device configured to deliver a plurality of electrical power supplies from the regulated electrical power supply; and
      a switch device configured to connect the regulated electrical power supply selectively to certain thrusters.

2. The space vehicle according to claim 1, wherein the at least one solid-propellant chemical thruster is electrically controllable to enable the at least one solid-propellant chemical thruster to be switched on and off, and to enable thrust of the at least one solid-propellant chemical thruster to be modulated.

3. The space vehicle according to claim 1, wherein the power supply and control device includes a shared telemetry, a shared remote control, and a shared control logic for the at least one solid-propellant chemical thruster and for the at least one electric thruster.

4. The space vehicle according to claim 1, wherein the power supply and control device is configured to enable the at least one solid-propellant chemical thruster and the at least one electric thruster to operate simultaneously.

5. The space vehicle according to claim 1,
   wherein the at least one solid-propellant chemical thruster comprises:
      at least one main solid-propellant chemical thruster; and
      a plurality of secondary solid-propellant chemical thrusters having a smaller size and lower power than the at least one main solid-propellant chemical thruster.

6. The space vehicle according to claim 1,
   wherein the at least one electric thruster comprises:
      at least one main electric thruster; and
      a plurality of secondary electric thrusters having a smaller size and lower power than the at least one main electric thruster.

7. The space vehicle according to claim 5,
   wherein the at least one main solid-propellant chemical thruster is arranged substantially on and pointing along an inertia axis of the space vehicle;
   the at least one electric thruster comprises a plurality of main electric thrusters arranged around the at least one main solid-propellant chemical thruster; and
   the plurality of secondary solid-propellant chemical thrusters includes three secondary solid propellant chemical thrusters pointing along directions that are not coplanar.

8. The space vehicle according to claim 1, whose propulsion is provided exclusively by the at least one solid propellant chemical thruster and by the at least one electric thruster.

9. The space vehicle according to claim 1, further comprising at least one thrust steering device for controlling an orientation of a thrust vector of the at least one solid propellant chemical thruster, and wherein the power supply and control device delivers at least one power supply adapted to an operation of said at least one thrust steering device.

10. The space vehicle according to claim 6, wherein the at least one solid-propellant chemical thruster comprises at least one main solid-propellant chemical thruster arranged substantially on and pointing along an inertia axis of the space vehicle;
- the at least one main electric thruster including a plurality of the main electric thrusters arranged around the main solid-propellant chemical thruster; and
- the plurality of secondary electric thrusters comprising at least three secondary electric thrusters pointing along directions that are not coplanar.

\* \* \* \* \*